United States Patent
Steinel et al.

(10) Patent No.: US 6,827,194 B2
(45) Date of Patent: Dec. 7, 2004

(54) CLUTCH ACTUATION DEVICE

(75) Inventors: Klaus Steinel, Bergrheinfeld (DE); Bernd Förster, Dittelbrunn (DE); Herbert Voit, Schweinfurt (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/442,731

(22) Filed: May 21, 2003

(65) Prior Publication Data

US 2003/0221930 A1 Dec. 4, 2003

(30) Foreign Application Priority Data

May 29, 2002 (DE) .......................... 102 24 106

(51) Int. Cl.[7] .......................... F16D 25/08; F16D 23/14
(52) U.S. Cl. ............... 192/86; 192/85 C; 192/85 CA; 192/98; 192/110 B
(58) Field of Search ................. 192/86, 85 C, 192/85 CA, 98, 30 W, 109 F, 89.24, 110 B; 91/361; 384/513

(56) References Cited

U.S. PATENT DOCUMENTS

| | | | | |
|---|---|---|---|---|
| 535,264 A | * | 3/1895 | Smith .......................... | 192/86 |
| 4,489,816 A | | 12/1984 | Sigg | |
| 4,658,945 A | * | 4/1987 | Muller .................... | 192/89.24 |
| 4,889,217 A | | 12/1989 | Janiszewski et al. | |
| 4,966,473 A | * | 10/1990 | Jacob ........................ | 384/477 |
| 4,989,711 A | | 2/1991 | Schultz et al. | |
| 5,850,898 A | * | 12/1998 | Bohme et al. ............. | 192/54.3 |
| 5,974,665 A | * | 11/1999 | Frielingsdorf et al. . | 29/894.361 |
| 6,085,885 A | | 7/2000 | Herzig et al. | |
| 6,167,995 B1 | | 1/2001 | Lindner | |
| 6,578,690 B2 | * | 6/2003 | Gochenour ............ | 192/85 CA |
| 2002/0060116 A1 | | 5/2002 | Otto et al. | |
| 2003/0047406 A1 | * | 3/2003 | Szadkowski et al. .... | 192/89.24 |

FOREIGN PATENT DOCUMENTS

| | | |
|---|---|---|
| DE | 29 23 487 A1 | 12/1980 |
| DE | 33 26 119 C1 | 3/1985 |
| DE | 41 20 838 C2 | 4/1994 |
| DE | 197 00 935 A1 | 8/1997 |
| DE | 197 16 600 A1 | 12/1997 |
| DE | 198 22 285 A1 | 11/1999 |
| DE | 100 57 610 A1 | 5/2002 |
| EP | 0 919 741 A1 | 6/1999 |
| JP | 61-223339 A | * 10/1986 |
| WO | WO 03/019026 | 3/2003 |

* cited by examiner

Primary Examiner—Rodney H. Bonck
(74) Attorney, Agent, or Firm—Cohen, Pontani, Lieberman & Pavane

(57) ABSTRACT

An actuation device for a shiftable clutch includes a pressure supply for providing a pressure of a pressure medium for actuating the clutch, and a first and a second workspace independently in communication with the pressure supply for receiving the pressure. A first piston surface is disposed in the first workspace and is operably displaceable in a first direction responsive to the pressure. A second piston surface is disposed in the second workspace and is operably displaceable in a second direction responsive to the pressure. The second direction is oriented opposite to the first direction. One of the first or second piston surfaces is responsive to an application of the pressure in the respective workspace displacing in the respective first or second direction to exert the actuation force.

36 Claims, 8 Drawing Sheets

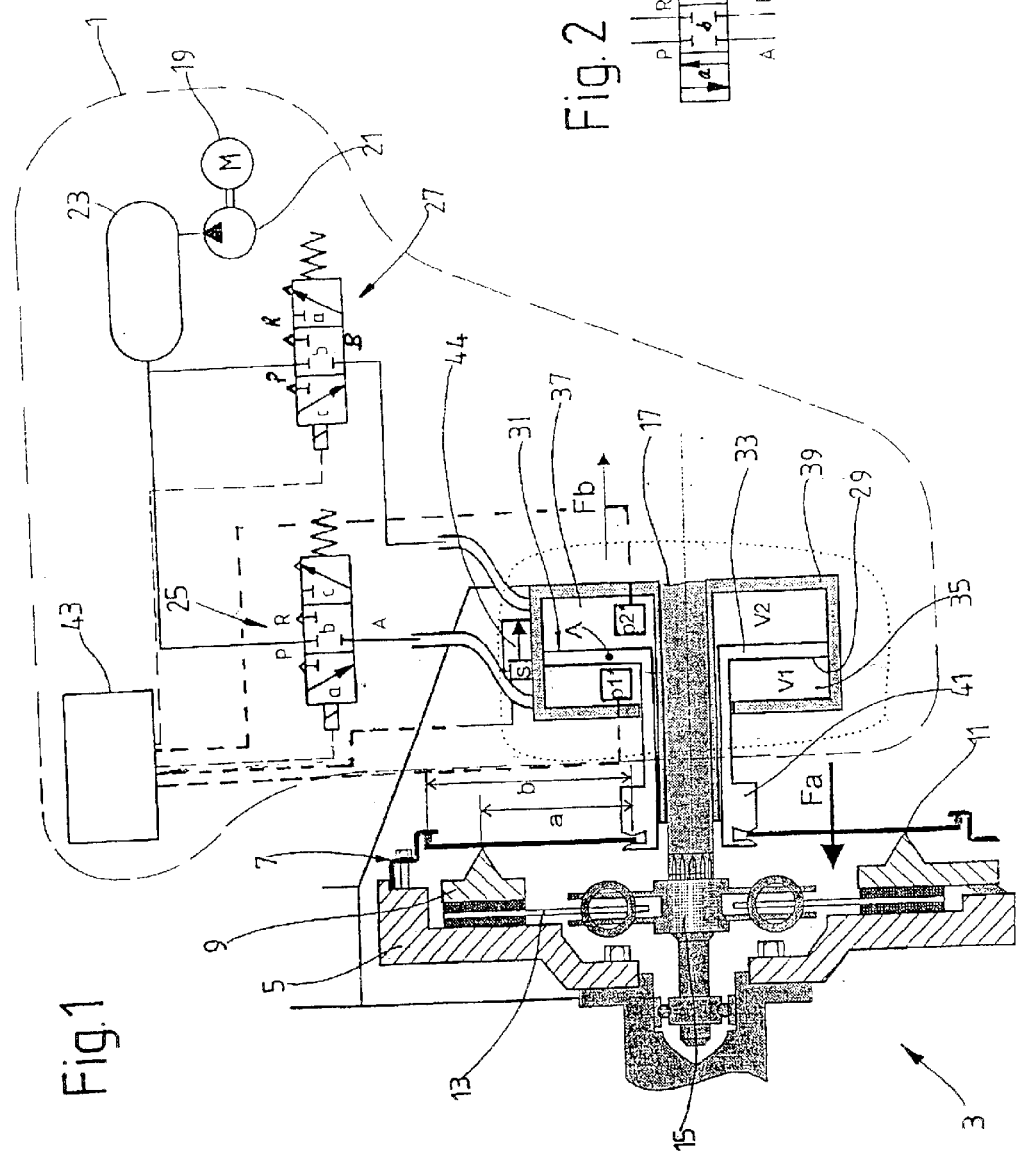

CLUTCH ACTUATION DEVICE

FIELD OF THE INVENTION

The invention relates to a clutch actuation device using a hydraulic or pneumatic pressure to open or close a clutch with an oppositely directed operating movement.

BACKGROUND OF THE INVENTION

DE 29 23 487 discloses an actuation device for a clutch, in which a piston, in conjunction with a cylinder filled with a pressure medium, opens a clutch. During a closing movement of the clutch, the piston is moved back into its initial position by a spring as part of the actuation device. The return movement is a consequence of the spring action travel.

An increase in the length of the return travel decreases, the force of the return spring. Consequently, the force of the return spring must be sized such that the initial position of the piston can be reached every time. A spring that is over designed, i.e. a spring that has an excess force, subjects the components of the actuation device to considerable stress. Thus, these components must be sized correspondingly robust.

DE 33 26 119 discloses that a plurality of piston/cylinder units can be used for the disengagement movement of a clutch.

DE 197 16 600 discloses an actuation device with an axially movable piston within a cylinder capable of being filled arbitrarily with a pressure medium which may be used for clutch actuation both by means of a tensile force and by means of a compressive force.

DE 197 00 935 A1 discloses an actuation device for a shiftable clutch. An electric actuator activates a master cylinder which, in turn, acts on a slave cylinder. It is further disclosed that if the actuator is combined with the master and the slave cylinder, opening and closing forces can also act actively on the clutch. Therein, the master and slave cylinder are arranged so as to be spatially separate. Thus, the medium displaced out of the master cylinder acts on the piston in the direction of extension of the slave cylinder.

When compressed air is used as the medium, no forces in the direction of retraction of the piston can be exerted by the slave cylinder when the piston of the master cylinder is extended. Since, compressed air is a compressible medium, retracting the slave cylinder piston does cause the master cylinder piston to extend. Only when a liquid is used as pressure medium can such a cause and effect occur.

SUMMARY OF THE INVENTION

It is an object of the present invention is to implement an actuation device for a clutch, which, even when the pressure medium used is compressed air, can exert opening and closing forces actively on the clutch.

This and other objects are achieved, when at least two piston surfaces are connected to the pressure supply device. The two piston surfaces execute an oppositely directed operating movement in the event of a pressure supply.

Since pressure is supplied to at least two piston surfaces, predetermined forces are transmitted, irrespective of the compressibility of the pressure medium. Thus, the actuation device can be operated with a defined excess pressure, in order, for example, to compensate for frictional effects on the moved parts.

It is an object to provide physically compact solution. Thus, the piston surfaces are arranged on a common piston. However, it is also possible of locating the piston surfaces on spatially separate pistons.

Furthermore, the two working spaces are arranged in a common cylinder. Thus, a double-acting cylinder may be used.

To activate the operating movement of the piston surfaces, the two working spaces are connected at least one flow valve. Alternatively, there is a possibility of each of the working spaces utilizing each a separately activatable flow valve.

During the opening or closing of the clutch, masses have to be moved. The inertia of the masses are disadvantageous for the useful life of the actuation device.

To produce specific feed and discharge conditions of the pressure medium, the operating movements of the piston surfaces can be braked in a specific way. For example, the outflow cross section or the times for the passage position of the valve for the decreasing working spaces may be reduced in a specific way, in order to utilize a counterpressure in that working space.

It is, therefore, advantageous that pressure sensing be performed in at least one of the two working spaces. Alternatively or in combination, with an earlier embodiment the travel of the piston surface during an operating movement may be detected by a travel sensing device. Consequently, the position of the piston surface and, therefore, also the instantaneous operating state of the shiftable clutch can be detected, irrespective of the compression behavior of the operating medium within the working space.

At least one of the working spaces may be arranged eccentrically to a transmission shaft. However, at least one of the working spaces may also be arranged concentrically to a transmission shaft.

Advantageously, the shiftable clutch may have a number of levers which are operatively connected to the pressure plate of the clutch. The levers are activated, in turn, by a transmission element which is operatively connected to the piston surfaces. The transmission element has transmission rings which act on the levers in an opening and a closing direction of the clutch. Consequently, the shifting movement of the clutch may be executed by means of a single transmission element.

There are at least two possibilities for the configuration of the levers. Thus, the levers may be prestressed in the closing direction of the clutch by a spring force. Thus, separate springs may be used which act on the levers, or levers with a specific spring action for example, diaphragm springs.

The levers my also be a means for force-free transmission. In this case, the closing force of the clutch must be generated completely by the piston surface in conjunction with the pressure medium in one working space. The levers can then be used as rigid pivoting levers.

Particularly with a view to simplifying assembly, the transmission rings are connected firmly to one another and form a continuous groove for receiving the levers of the shiftable clutch.

Furthermore, in an exemplary embodiment, the transmission rings are mounted so as to be axially displaceable in relation to the transmission element within a limited scope counter to a spring force. The axial displaceability likewise makes it substantially easier to assemble the clutch together with the actuation device.

Thus, the transmission rings are prestressed toward a holding surface by the spring force. For assembly in one direction, the holding surface is formed by a securing ring.

Alternatively, the transmission rings may be positioned against one stop and may be secured axially by means of a second stop.

To simplify manufacture, the second stop is formed by a peening over of the transmission element. A play-free connection is obtained between the transmission element and the transmission rings.

While a simple arrangement of rolling bodies may be sufficient for actuating a clutch the two piston surfaces may also be used to prestress an already closed clutch actively by means of utilization of the pressure supply device. For absorbing the forces associated with this, therefore, it may be expedient that a mounting which has a double-row arrangement of rolling bodies is formed functionally between the levers and the piston surfaces.

For a further increase in the permissible axial forces on the mounting, the center lines of the rolling bodies are formed in an X-arrangement with respect to their outer running surfaces.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings:

FIG. 1 shows an embodiment of a shiftable clutch with an actuation device according with the present invention.

FIG. 2 shows a schematic of a flow valve operation combining the operation of at least two flow valve.

DETAILED DESCRIPTION OF THE PRESENTLY PREFERRED EMBODIMENTS

Figure 3:
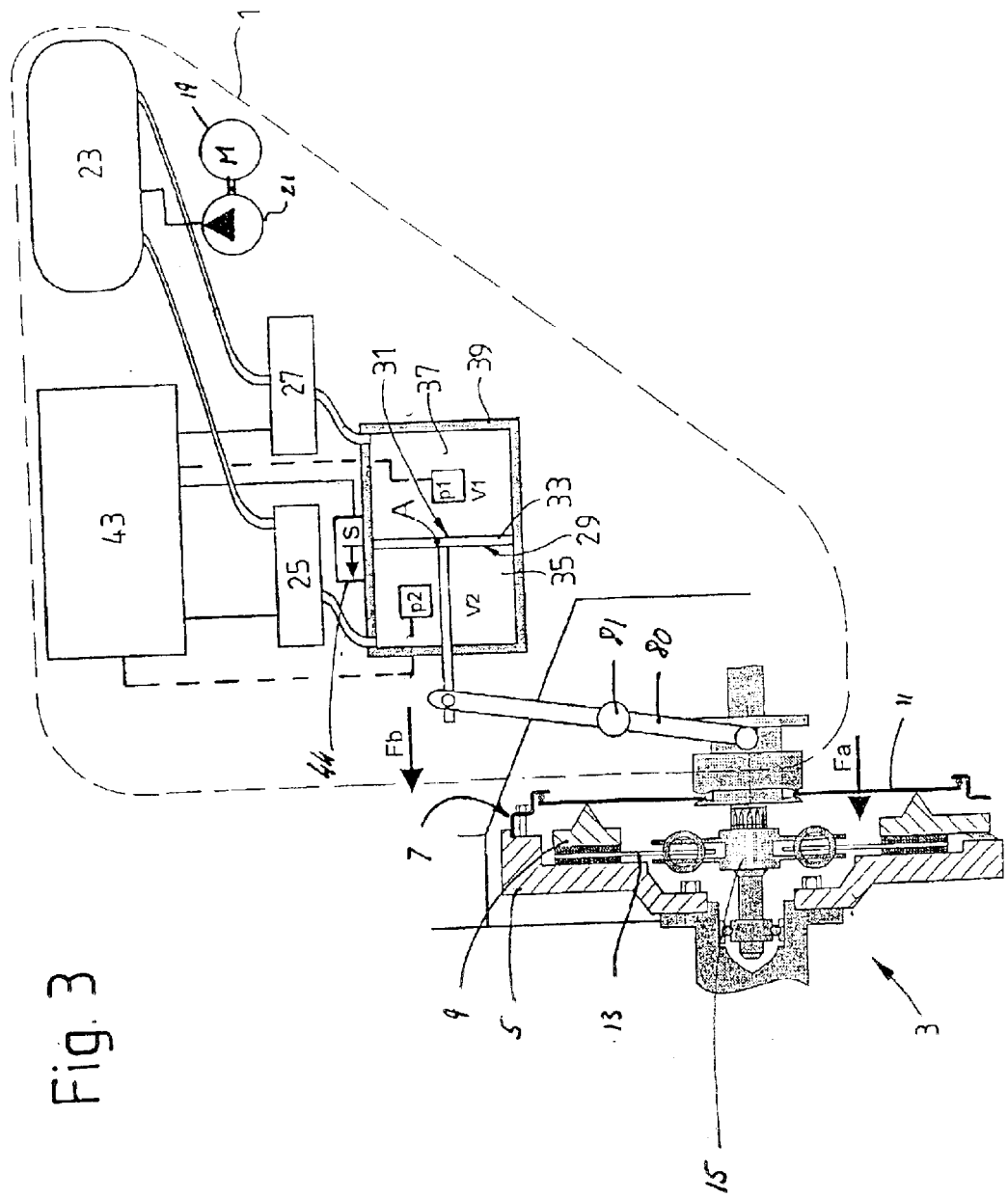
FIG. 3 shows an alternative arrangement for the transmission element.

FIG. 1 shows an actuation device 1 and a user-selectable shiftable clutch 3. The clutch 3 includes a flywheel 5 arranged on the side nearest the engine. A housing 7 is connected axially and rotatably fixed to the fly wheel 5. The housing 7, in turn, carries an axially movably mounted pressure plate 9 which is operatively connected to a number of levers 11. Between the pressure plate and the flywheel 5 is arranged a clutch disc 13, the hub 15 of which is guided axially displaceably on a transmission shaft 17. With the clutch engaged, as shown in FIG. 1, the engagement force is transmitted from a crankshaft of the engine to the flywheel 5. From there the force is transmitted via the clutch disc 13, which is prestressable between the flywheel 5 and the pressure plate 9, to the hub 15. The hub 15 is operably engaged with the transmission shaft 17.

The structural configuration of the clutch is to be understood to be merely exemplary. Different types of clutch, such as multiple disc clutches that are commonly know as two-mass flywheels may also be used.

The actuation device 1 comprises a drive device 19 for a pressure supply device 21 which is connected to a pressure medium accumulator 23. Air is preferably provided as a pressure medium, but, in principle, a hydraulic fluid may also be used. Accumulator 23 is connected to at least one flow valve; herein flow valves 25 and 27 are illustrated. Flow valves 25, 27 regulate the pressure supply on at least two piston surfaces 29, 31.

Piston surface 29, 31 are disposed to move in opposing directions. As shown in FIG. 1, the piston surfaces 29, 31 may be on a common piston 33. However, separate pistons may also be used.

Piston 33 defines two working spaces 35 and 37 in a common cylinder 39. Working spaces 35, 37 may be connected directly to the pressure supply device 21 or flow valves 25, 27 may be disposed in the supply lines. Therein, two flow valves 25, 27 are provided where the position of the valves are determined by a common control device 43. For each valve 25, 27, connection P makes a connection to the pressure supply device 21, i.e. the accumulator 23. Connection R is connected to the atmosphere and connections A and B connect working spaces 35, 37, respectively. Alternatively, a single flow valve 25a may also be used, which has the connections A, B on the outlet side, as illustrated in FIG. 2. Valve positions a, b, and c are indicated schematically in FIGS. 1 and 2.

The cylinder 39 is arranged fixedly on the transmission side and thus is also affixed to the engine, so that a transmissive movement by levers 11 from the piston 29 via a transmission element 41 is effected on the pressure plate 9. It is possible, in principle, that the levers 11 exert a prestressing force on the pressure plate 9 and the shiftable clutch 3, as a subassembly, can always be used, independently of the actuation device 1, with a transmittable drive torque of the engine. The pressure in the transmission-side working space 37 can increase the transmittable engine torque in addition to the prestressed levers. Levers 11 are that not prestressed may also be used. Thus, clutch 3 is moved into the closing position and is prestressed solely by the instantaneous pressure in the transmission-side working space 37.

Starting from the closed position, corresponding to valve position b, in FIGS. 1 and 2, of the shiftable clutch 3, during an opening movement, corresponding to valve position a in FIGS. 1 and 2, of the clutch 3, the engine-side working space 35 and consequently the piston surface 29 are acted upon, via the flow valve 25, by a pressure medium in the form of a gas or else of a hydraulic medium. At the same time, a control device 43 ensures that the second flow valve 27 engage the connection B to the connection R, corresponding to valve position a of flow valve 27 in FIG. 1. By virtue of the differential pressure between the two working spaces 35; 37 that acts on the annular piston surface 29, the transmission element 41 is displaced in the direction of the transmission. The pressure medium contained in the transmission-side working space 37 is voided via the connection R of the flow valve 27. Simultaneously, the levers 11 are moved and the prestressing force Fa of the pressure plate 9 on the clutch disc 13 is reduced to an extent such that no engine torque is transmitted to the transmission. For this purpose, the pressure plate 9 is prestressed in the direction of the levers 11 via springs, not illustrated. All the levers 11 are connected in an articulated manner to the pressure plate 9.

At the end of the disengagement movement of the transmission element 41, the second flow valve 27 may already be moved into the blocking position, i.e. valve position b, depicted, while the first flow valve 25 still supplies pressure medium to the engine-side working space 35, i.e. valve position a. The pressure drop between working spaces 35, 37 is thereby reduced, with the result that a braking effect is exerted on the transmission element 41. For this purpose, pressure sensors P1 and P2 are arranged in working spaces 35, 37, so that the braking effect can be controlled in a specific way. Alternatively or in combination, a travel sensing device 44 may also be used.

In order to close, i.e. engage, the shiftable clutch 3 again, the two flow valves 25, 27 are moved into the valve position(s) c of FIGS. 1 and 2. The transmission-side working space 37 then has the higher pressure level. A braking movement may likewise be exerted on the transmission element 41 by means of a combined activation of the flow valves 25, 27 two valves, when the first flow valve 25 is already moving into a partly blocked position i.e. valve position b when the transmission element is just short of its end position.

FIG. 3 shows that the two oppositely effective piston surfaces 29, 31 are not required to be in a concentric arrangement of the cylinder 39 to the transmission shaft 17. Thus, the present invention may be utilized even in the case of an eccentric application of force to the transmission element 41 via an actuating lever 80 about a pivot 81.

Figure 4:
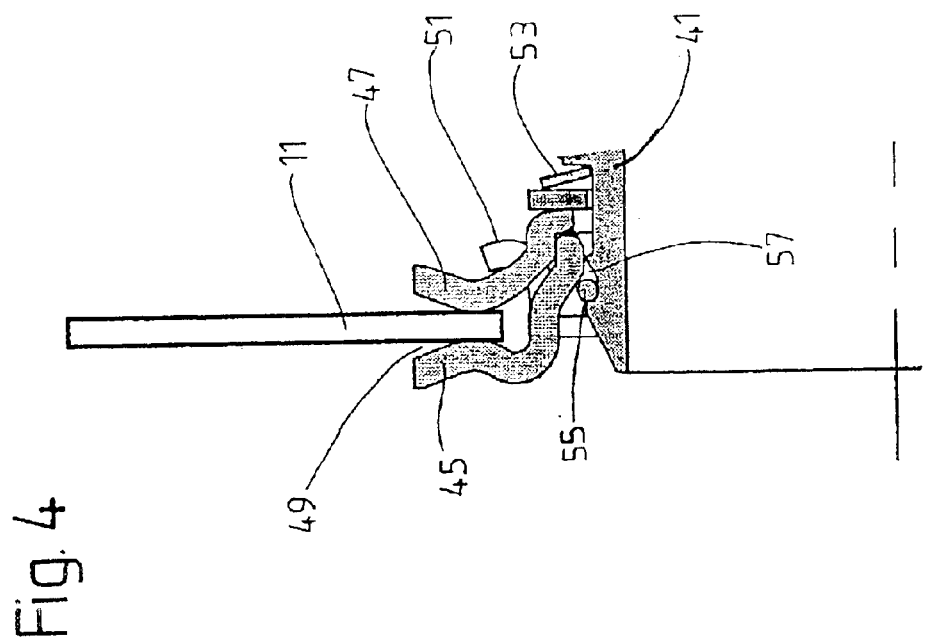
FIGS. 4–5 are partial cross-section view of the interaction of the transmission rings and the levers.

FIG. 4 is a partial cross-sectional view of the connection of a lever 11 to the transmission element 41. Two transmission rings 45, 47 form a continuous groove 49, into which the end of a lever 11 may be introduced. For this purpose, during assembly, the lever 11, with the clutch 3 engaged, is deflected slightly in the opening direction of the clutch and the transmission element 41, together with transmission rings 45, 47 is guided into the inner space formed by the levers 11. In the event of a synchronous closing movement of the transmission element 41 and of the levers 11, the latter slide into groove 49. For this purpose, the outer edges of the transmission elements 41 form a V-shape in cross section. The transmission rings 45, 47 may be welded to one another or have a form-fitting connection, in that a tongue-shaped prolongation 51 of one transmission ring 45 passes through the other transmission ring 47 on the inside.

If the construction space is not sufficient for a disengagement movement of the transmission element 41 during assembly, the two transmission rings 45, 47 may additionally be displaced counter to a spring force during assembly. The spring force, advantageously generated by an annular spring 53, presses the transmission rings against a holding surface which is formed by a spreadable securing ring 55 within a holding groove 57. The transmission element 41 is consequently capable of exerting axial forces in both directions and on the lever 11 or levers 11.

Figure 5:
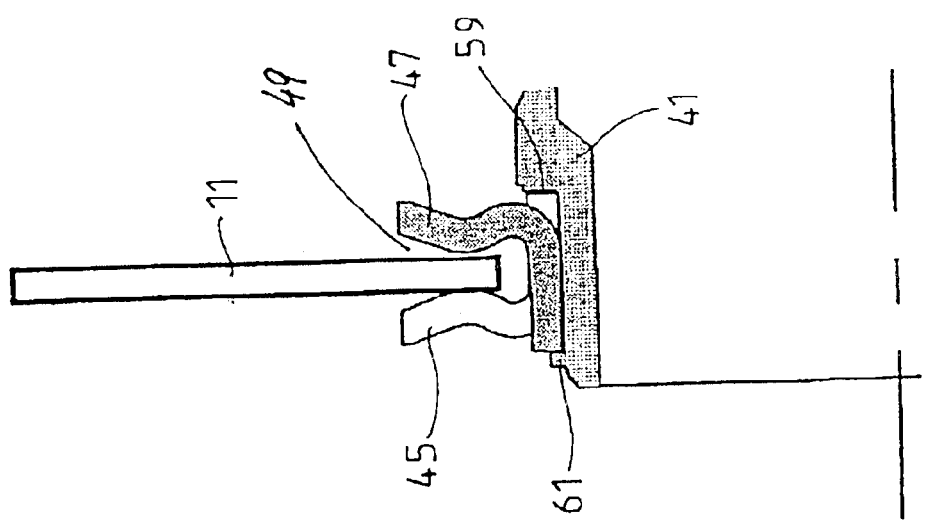

Particularly simple force transmission between the transmission element 41 and the levers 11 is illustrated in FIG. 5. The transmission element 41 has a first transmission-side stop 59 for the transmission rings 45, 47. When the transmission rings 45, 47 have been pushed onto the transmission element 41, a second engine-side stop 61 is formed by peening over of the transmission element 41. The transmission rings 45, 47 can consequently be secured axially, free of play, between the two stops 59, 61.

FIGS. 6 to 9 are views of the transmission element 41 in a selected detail. The shiftable clutch 3 is connected to the crankshaft of the engine and so that, with the clutch 3 closed, the levers 11 also rotate at the rotational speed of the crankshaft, but the transmission, which also carries the transmission element 41, remains fixed.

To compensate for the relative movement, a mounting 63 is formed within the divided transmission element 41. A transmission-side portion 41g of the transmission element 41 has an at least segment-like holding flange 65, to which is connected a holding ring 67 which has essentially an L-shape. An outer ring 71 of a mounting provided with rolling body or bodies 73 is fixed axially between the holding flange and a web 69 of the holding ring 67. An inner ring 75 can rotate, together with the levers 11 and the transmission rings 45, 47 in relation to the outer ring 71 of the mounting on an engine-side portion 41m of the transmission element.

Figure 6:
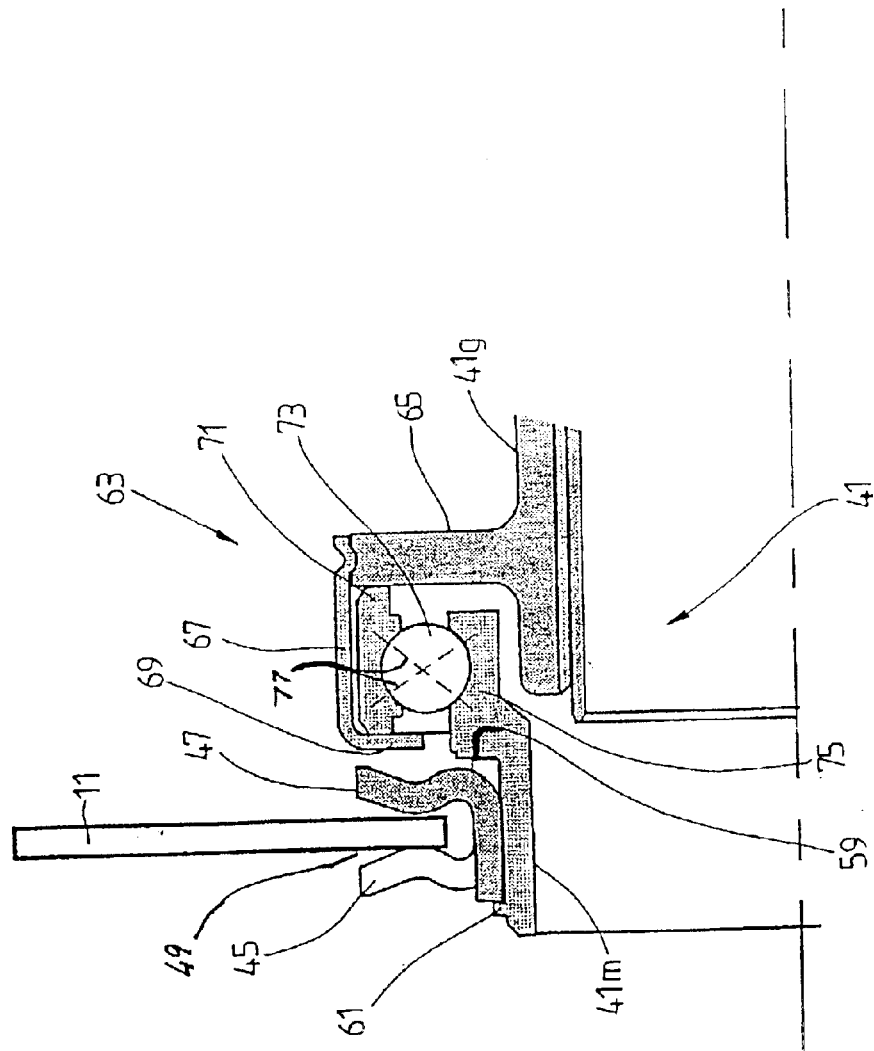
FIGS. 6–9 are partial cross-sectional views of the mounting.
Figure 7:
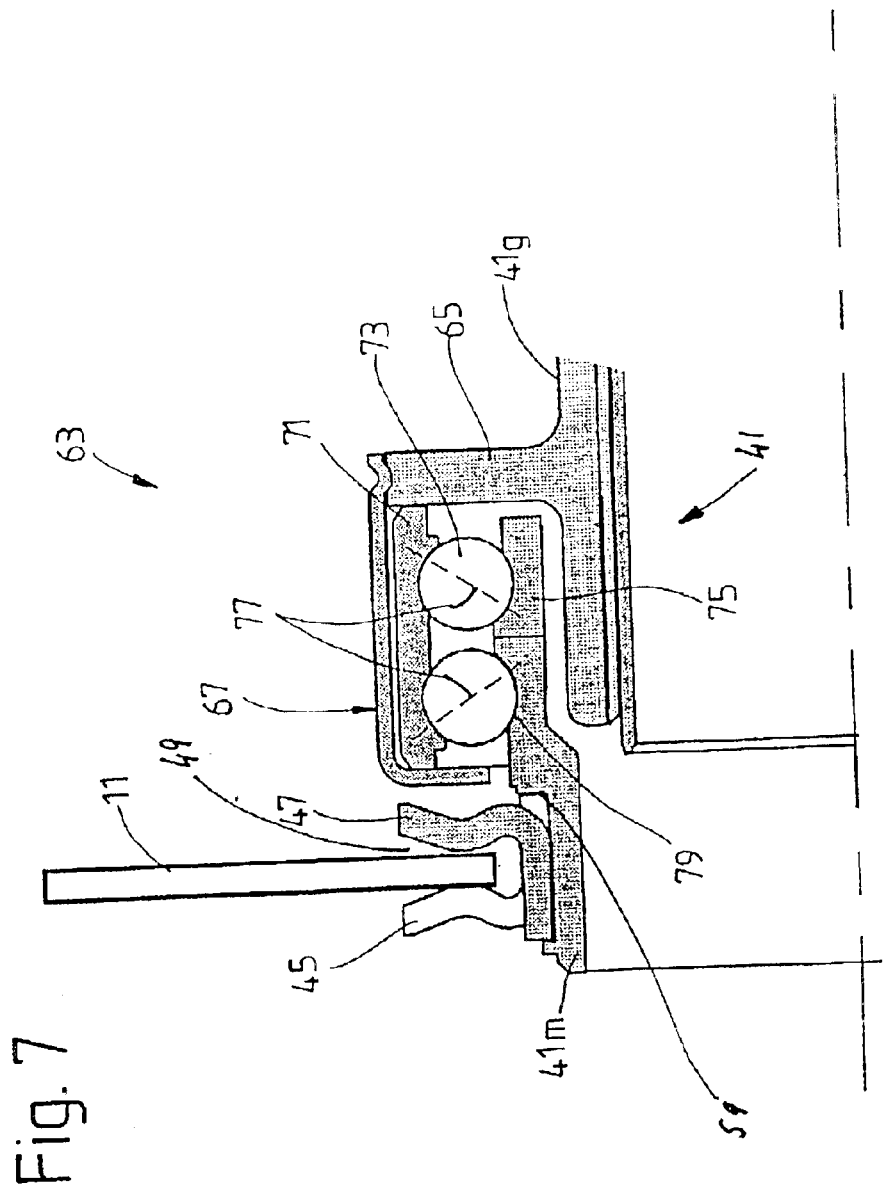

In FIG. 6, the mounting 63 has only a single-row arrangement of rolling bodies B of any desired shape. In FIG. 7, a two-row arrangement is used, which has an undivided outer ring 71 and a divided inner ring 75. The center lines 77, also called pressure lines, of the rolling bodies 73 are oriented in an X-arrangement with respect to their outer-running surfaces 79, so that maximum axial force transmission can be ensured. Again, the holding ring 67 braces the outer ring 71 of the mounting in relation to the holding flange 65 of the transmission-side portion 41g of the transmission element.

Figure 8:
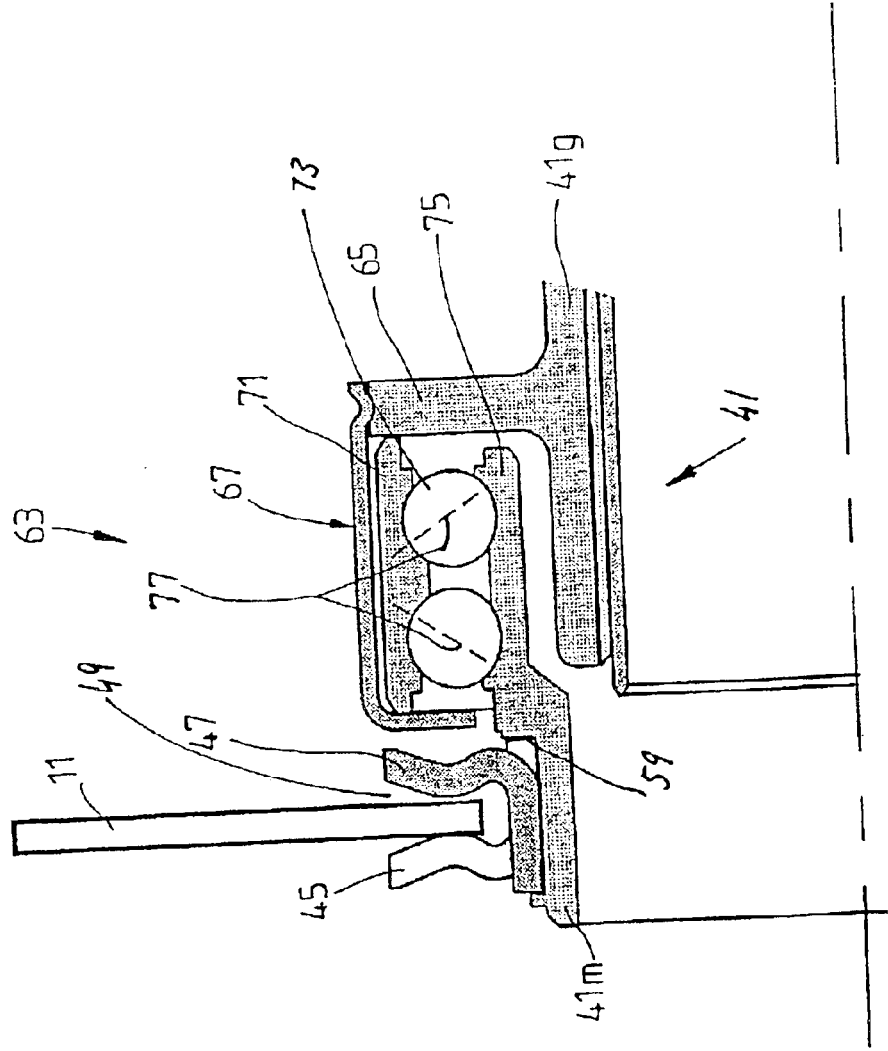
Figure 9:
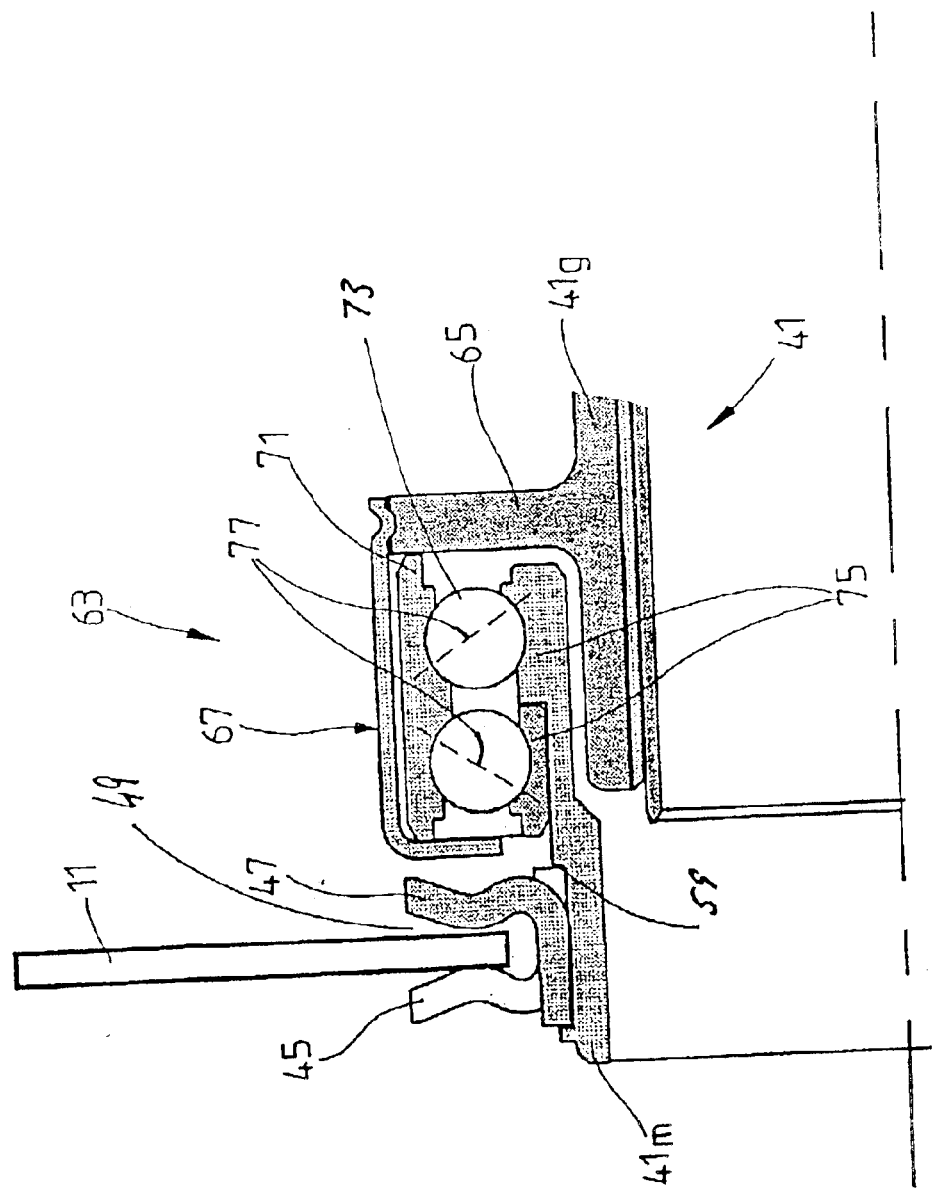

Furthermore, as shown in FIG. 8, an arrangement of the center lines in an O-arrangement is also possible, in which case it is expedient to use an undivided inner ring and outer ring 71, 75 of the mounting. To complete the implementation possibilities, FIG. 9 shows a mounting of the rolling bodies in an O-arrangement wherein a divided inner ring 75 may be used.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An actuation device for a shiftable clutch, the actuation device comprising:

a pressure supply for providing a pressure of a pressure medium for actuating the clutch;

a first and a second workspace independently in communication with the pressure supply for receiving the pressure;

a first piston surface disposed in the first workspace and operably displaceable in a first direction responsive to the pressure in the first workspace, a second piston surface disposed in the second workspace and operably displaceable in a second direction responsive to the pressure in the second workspace, the second direction oriented opposite to the first direction, one of the first and second piston surfaces moving in one of the first and second directions responsive to an application of the pressure in the respective workspace to exert an actuation force;

a plurality of levers operably connected to a pressure plate of the clutch;

a transmission element operably connected to the piston surfaces for movement in said first and second directions; and first and second transmission rings mounted on the transmission element and acting on the levers to engage and disengage the clutch, the first and second transmission rings being axially displaceable relative to the transmission element by a limited amount counter to a spring force.

2. The actuation device of claim 1, wherein the first and the second piston surfaces are disposed on a common piston.

3. The actuation device of claim 1, wherein the first and the second workspace are disposed in one cylinder.

4. The actuation device of claim 3 further comprising at least one flow valve for controllably passing the pressure, the at least one flow valve associated with the first and second workspace.

5. The actuation device of claim 4, further comprising a first and a second flow valve for independently of each other activating the passage of the pressure and controllably passing the pressure, each of the plural flow valves associated with the respective one of the first and second workspace.

6. The actuation device of claim 1, further comprising at least one pressure sensor disposed in one of the first or second workspace for measuring the pressure in the respective one of the first or second workspace.

7. The actuation device of claim 1, further comprising a travel sensing device for measuring a relative displacement of the first or the second piston surface in the respective workspace during application of the pressure.

8. The actuation device of claim 1, wherein at least one of the first or second workspace is positioned eccentric to a transmission shaft.

9. The actuation device of claim 1, wherein at least one of the first and second workspaces are positioned concentric to a transmission shaft.

10. The actuation device of claim 1 wherein the plural levers are prestressed to provide a spring force in a closing direction of the clutch.

11. The actuation device of claim 1, wherein the levers are a means for force-free transmission.

12. The actuation device of claim 1, wherein the first and second transmission rings are rigidly connected to each other and form a continuous groove for receiving the plural levers of the shiftable clutch.

13. The actuation device of claim 1, further comprising a spring disposed on the transmission element on the spring providing the spring force which the first and second transmission rings toward a holding surface on the transmission element.

14. The actuation device of claim 13, wherein the holding surface is disposed on a securing ring.

15. The actuation device of claim 1, wherein the transmission element includes a first stop and a second stop, the transmission element including a first axial direction; and wherein one of the plural transmission rings is positioned against the first stop and the other one of the plural transmission rings is positioned against the second stop, the first and second stop securing the plural transmission rings from a displacement in the first axial direction.

16. The actuation device of claim 15, wherein the second stop is a peening over of the transmission element.

17. The actuation device of claim 1, further comprising a mounting having a double-row arrangement of rolling bodies formed to be functionally between the plural levers and the plural piston surfaces.

18. The actuation device of claim 17, wherein the center lines of the rolling bodies are formed in an X-arrangement with respect to their outer-rolling surfaces.

19. An actuation device for a shiftable clutch, the actuation device comprising:

a pressure supply for providing pressure of a pressure medium for actuating the clutch;

a first and a second workspace independently in communication with the pressure supply for receiving the pressure;

a first piston surface disposed in the first workspace and operably displaceable in a first direction responsive to pressure in the first workspace, a second piston surface disposed in the second workspace and operably displaceable in a second direction responsive to pressure in the second workspace, the second direction oriented opposite to the first direction, the piston surfaces moving in one of the first and second directions responsive to an application of the pressure in the respective workspace to exert the actuation force;

a plurality of levers operably connected to a pressure plate of the clutch;

a transmission element operably connected to the piston surfaces for movement in said first and second directions;

first and second transmission rings mounted on the transmission element and acting on the levers to engage and disengage the clutch; and a mounting comprising a double row of rolling bodies arranged functionally between the levers and the piston surfaces.

20. The actuation device of claim 19, wherein the first and the second piston surfaces are disposed on one piston.

21. The actuation device of claim 19, wherein the first and the second workspace are disposed in one cylinder.

22. The actuation device of claim 21 further comprising at least one flow valve for controllably passing the pressure, the at least one flow valve associated with the first and second workspace.

23. The actuation device for a shiftable clutch of claim 22, further comprising a first and a second flow valve for independently of each other activating the passage of the pressure and controllably passing the pressure, each of the plural flow valves associated with the respective one of the first and second workspace.

24. The actuation device of claim 19, further comprising at least one pressure sensor disposed in one of the first or second workspace for measuring the pressure in the respective one of the first or second workspace.

25. The actuation device for a shiftable clutch of claim 19, further comprising a travel sensing device for measuring a relative displacement of the first or the second piston surface in the respective workspace during application of the pressure.

26. The actuation device for a shiftable clutch of claim 19, wherein at least one of the first or second workspace is positioned eccentric to a transmission shaft.

27. The actuation device for a shiftable clutch of claim 19, wherein at least one of the first or second workspace is positioned concentric to a transmission shaft.

28. The actuation device of claim 19 wherein the plural levers are prestressed to provide a spring force in a closing direction of the clutch.

29. The actuation device of claim 19, wherein the levers are a means for force-free transmission.

30. The actuation device of claim 19, wherein the first and second transmission rings are rigidly connected to each other and form a continuous groove for receiving the plural levers of the shiftable clutch.

31. The actuation device for a shiftable clutch of claim 19, wherein the first and second transmission rings are mounted on the transmission element such that the plural transmission rings are axially displaceable relative to the transmission element by a limited amount counter to a spring force.

32. The actuation device for a shiftable clutch of claim 31, further comprising a spring disposed on the transmission element, the spring providing a spring force which prestresses the first and second transmission rings toward a holding surface on the transmission element.

33. The actuation device of claim 32, wherein the holding surface is disposed on a securing ring.

34. The actuation device of claim 19, wherein the transmission element includes a first stop and a second stop, the transmission element including a first axial direction; and wherein one of the plural transmission rings is positioned against the first stop and the other one of the plural transmission rings is positioned against the second stop, the first and second stop securing the plural transmission rings from a displacement in the first axial direction.

35. The actuation device of claim 34, wherein the second stop is a peering over of the transmission element.

36. The actuation device of claim 19, wherein the center lines of the rolling bodies are formed in an X-arrangement with respect to their outer-rolling surfaces.

* * * * *